Figure 1:
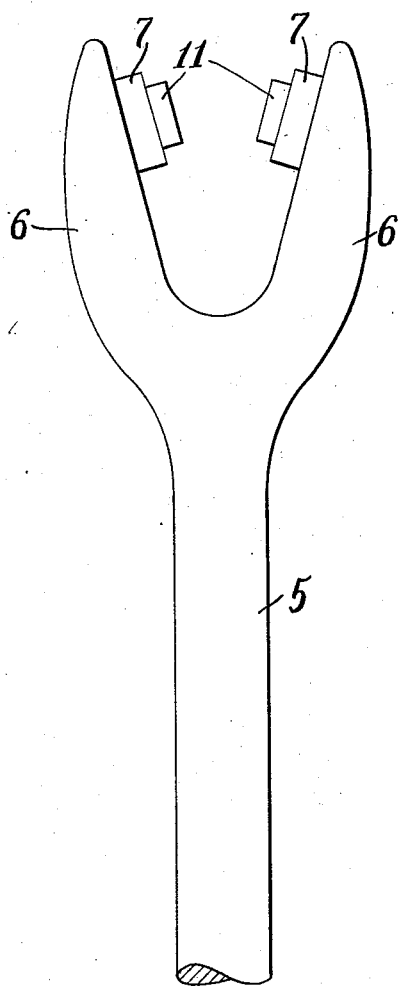

April 8, 1930.  C. L. PEIRCE, JR  1,753,216
GUY ROD AND METHOD OF MAKING IT

Filed May 1, 1929

INVENTOR
Charles L. Peirce, Jr.
By Green & McCallister
His Attorneys

Patented Apr. 8, 1930

1,753,216

UNITED STATES PATENT OFFICE

CHARLES L. PEIRCE, JR., OF PITTSBURGH, PENNSYLVANIA, ASSIGNOR OF ONE-HALF TO HUBBARD AND COMPANY, A CORPORATION OF PENNSYLVANIA

GUY ROD AND METHOD OF MAKING IT

Application filed May 1, 1929. Serial No. 359,578.

This invention relates to guy rods such as are commonly employed for securing the ends of guy cables or wires used in connection with telegraph and telephone poles and the like.

In using the conventional form of guy rod having a plain drop forged eye, it is customary to employ a guy thimble constructed and arranged to extend through the eye for the purpose of protecting the guy cable or wire as it is drawn taut before being clamped. With such an arrangement it is necessary for a man to hold the thimble in proper position to keep it in place and also from pinching the cable during the drawing operation. Various attempts have been made heretofore to overcome the disadvantages of this construction, but these have been unsatisfactory for different reasons, such as weakening the eye, flattening the cable, expense of manufacture, or the like.

An object of this invention is to provide a device of the type set forth constructed and arranged to overcome the disadvantages above set forth.

One form of guy rod has heretofore been employed in which a cable supporting pulley or wheel has been mounted on an open eye and the latter then closed by welding. This has proven unsatisfactory for the reason that the weld fails to withstand the strains placed upon it.

A further object of this invention is to provide a guy rod having a welded eye of such construction and arrangement that the weld is subjected to no strains by the associated cable.

A still further object is to provide an improved method of making guy rods.

Figure 2:
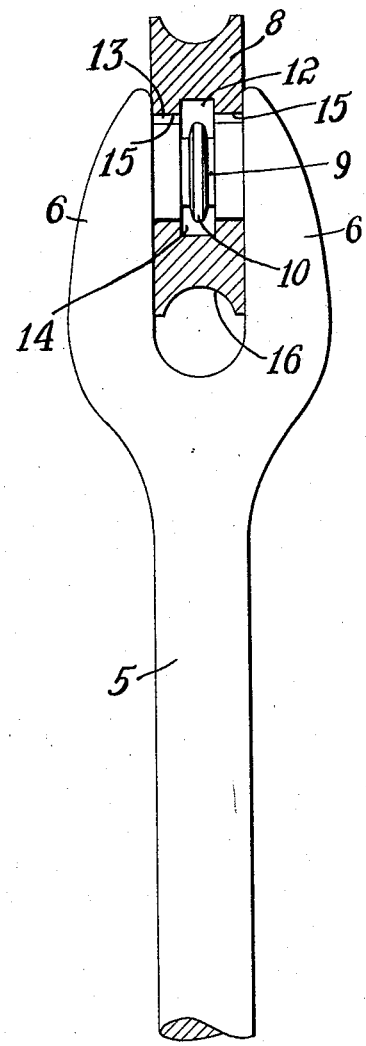

These and other objects which will be apparent to those skilled in this particular art are accomplished by means of the invention illustrated in the accompanying drawings in which Figure 1 is a view in side elevation of a partially formed guy rod made in accordance with one embodiment of this invention and Fig. 2 is a similar view of the finished rod showing an associated guy cable thimble mounted in place.

In the particular embodiment of this invention which has been chosen for the purposes of illustration, a suitable guy rod blank 5 is formed in any desired manner, as, for example, by drop forging, and the blank is bifurcated at one end so as to provide tines or prongs 6 each of which has an inwardly projecting stub shaft or lug 7 formed on the inner face of the tines adjacent to, but spaced from, the ends thereof.

A circular guy wire or cable receiving thimble or annulus 8 is then positioned between the prongs 6 and the latter are pressed together to the position indicated in Fig. 2 wherein the lugs or projections 7 abut against each other within the bore of the thimble 8 so as to form a supporting axle or shaft 9 extending therethrough. The abutting faces of the projections 7 are electrically welded so that the whole forms an integral unitary structure. For accommodating the flash 10, formed by the welding operation, the lugs 7 are each provided with reduced ends 11 which co-operate with an enlargement 12 of the thimble bore 13 for providing a space 14 around the abutting faces of the projections sufficient in size to accommodate the flash 10. As a result of this formation, laterally spaced bearing faces 15 are provided between the thimble and the supporting shaft on opposite sides of the weld so that the latter is not subjected to the strain imposed by the guy wire.

The thimble 8 (see Fig. 2) is of angular or circular form and has a groove 16 for receiving a guy wire. In order that the thimble 8 may be suitably mounted on the extending lugs 7 when they are in abutting relation, its center 15 is drilled or hollowed out. In order to prevent the thimble from binding on the welded portion 10, it has an even larger bore or cut out portion 12 along its longitudinal center. When the bifurcated end is open the thimble 8 is slipped over the lug 7 of one of the furcations 6, and the bifurcated end is pressed together so that the portions 11 of the lugs abut each other. In the boring out of the center of the angular thimble 8, the drilling of the portion 15 may be first accomplished, then the portion 12 may be further reamed out, or by the employment of a suitable tool, both 12 and 15 can be drilled out in the same operation. It will be noted that the bearing faces 15 and the enlargement 12 have a diameter large enough to permit play when the thimble 8 is mounted on the lugs 7—the purpose, being to prevent any possibility of binding.

It will be apparent that a guy rod is provided having a guy wire receiving thimble positioned therein in such a way as to permit an associated guy wire to be threaded through the eye and drawn taut without suffering any detrimental or weakening effect by such operation. Flattening of the associated guy wire is prevented by the groove 16 formed in the outer surface of the thimble.

It will be apparent that the strain applied to the guy rod by drawing up the associated cable does not operate directly on the welded portion thereof but, on the contrary, is absorbed by the thick heavy end portions 7 of the supporting shaft 9 adjacent their junction with the prongs 6 so that although a welded eye is employed, the strength of the closed forged eye is obtained.

What I claim as new and desire to secure by Letters Patent is:

1. A guy rod having a bifurcated end, a stub shaft formed on the inner surface of each furcation, a weld joining said stub shaft to form a single cross member and a cable receiving annulus having spaced bearing faces formed in the bore thereof for engaging said cross member on opposite sides of said weld.

2. A guy rod having a bifurcated end, a stub shaft formed on the inner surface of each furcation, a reduced portion on the end of each stub shaft, a weld connecting said reduced portions to form a cross member having spaced bearing faces on opposite sides of said weld and a cable receiving annulus supported on said bearing faces.

3. A guy rod having a bifurcated end, a stub shaft formed on the inner face of each furcation, a reduced portion on the end of each stub shaft, a weld connecting said reduced portions to form a cross member having spaced bearing faces on opposite sides of said weld and a cable receiving annulus having spaced bearing faces formed in the bore thereof for engaging said spaced bearing faces on said cross member.

4. The method of making a guy rod which consists in providing a rod with a forked end and having projecting stubs on each prong thereof, positioning an annular guy wire thimble therebetween, and pressing said prongs together so as to move said stubs into abutting position to form a support for said annulus extending therethrough and securing said stubs together.

5. The method of making a guy rod which consists in providing a guy rod having a forked end with inwardly projecting stubs, positioning an annular guy wire thimble therebetween, moving said stubs together to form a support for said annulus and welding the abutting faces of said stubs.

6. The method of making a guy rod which consists in providing a rod having a forked end and projecting stubs on each tine, reducing the ends of said stubs, moving said reduced ends into abutting position within the bore of an associated annulus and welding said abutting faces together.

7. The method of making a guy rod which consists in providing a rod having a forked end with projecting stubs on each tine, positioning an annular guy wire thimble having the central portion of the bore thereof enlarged between said tines, moving said stubs together so as to form a support for said annulus extending therethrough and welding the abutting faces of said stubs within the enlarged bore of said annulus.

8. A guy rod having a bifurcated end, a stub shaft formed on the inner surface of each furcation, a reduced portion on the end of each stub shaft, means for securing the extending ends of the stub shafts together, and a cable receiving annulus having spaced bearing faces formed in the bore thereof for mounting about said stub shafts for rotation thereabout.

9. The method of making a guy rod which includes providing a guy rod having a forked end with inwardly projecting stubs, reducing the ends of said stubs, positioning an annular guy wire thimble therebetween, moving said reduced ends into abutting position within the bore of an associated annulus and welding said abutting faces together.

In testimony whereof, I have hereunto subscribed my name this 27th day of April, 1929.

CHARLES L. PEIRCE, Jr.